July 7, 1953  I. H. LEHMAN  2,644,402
SELF-SEALING ROTOR FOR FLUID TRANSFERRING DEVICES
Filed Oct. 6, 1949
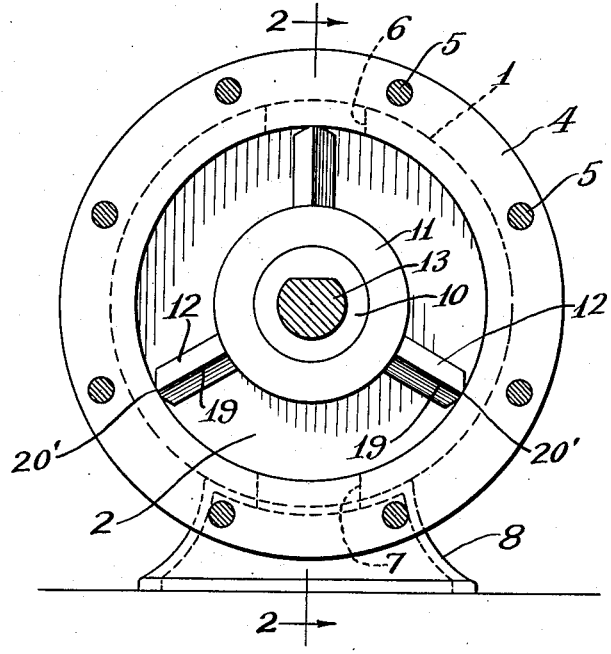
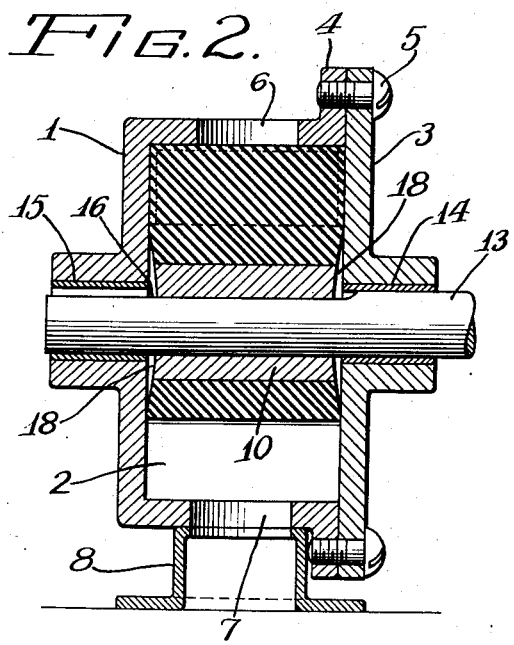
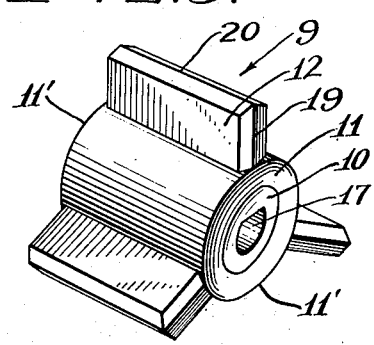
Inventor:
Irvin H. Lehman
By Lee J. Gary
Attorney Patented July 7, 1953

2,644,402

UNITED STATES PATENT OFFICE 2,644,402

SELF-SEALING ROTOR FOR FLUID TRANSFERRING DEVICES

Irvin H. Lehman, Kentland, Ind.

Application October 6, 1949, Serial No. 119,831

5 Claims. (Cl. 103—83)

This invention relates to improvements in rotors of the type constructed of resilient material and having radially extending vanes or blades, and refers particularly to a rotor which is adapted to be housed in a casing such as contemplated in fluid transferring devices, such as, fluid pumps or continuous fluid measuring or proportioning devices of the rotary type.

One of the important features of the present invention resides in the provision of a rotor constructed of relatively resilient material such as soft rubber or other rubber-like material, which is so constructed that it per se functions as a seal for the shaft openings in the housing in which the rotor operates.

Another important feature of the invention resides in the construction of the rotor vanes or blades which results in the sealing of one of the rotor compartments or sectors from the next adjacent rotor compartment or sector, during rotation of the rotor.

A further important feature of the invention resides in a rotor construction which in accomplishing the sealing functions hereinbefore described, does so with the addition of a minimum of friction at the sealed surfaces.

In the drawing, Fig. 1 is a sectional elevational view of a device employing my improved rotor, the face of the device being removed.

Fig. 2 is a transverse sectional view taken on line 2—2 of Fig. 1.

Fig. 3 is a perspective view of the rotor employed in the device as illustrated in Figs. 1 and 2.

Although my improved rotor may be employed in numerous applications such as in fluid pumps, fluid motors, fluid measuring or proportioning devices and the like, for purposes of description my invention will be described in conjunction with its use in a fluid measuring or proportioning device for which use it is particularly suitable.

Referring in detail to the drawing 1 indicates a cup shaped housing having an interior compartment 2. The housing 1 is provided with a face plate 3 which may be secured to a circular flange 4 which circumscribes the mouth of the cup shaped member 1, by means of screws 5. The housing 1 is provided with an intake opening 6 and a discharge opening 7, said housing being conveniently mounted upon a suitable base 8.

In fluid measuring or proportioning devices, the device may be connected in a pipe line through which a fluid may pass. The fluid measuring or proportioning device is usually provided with a rotating element whereby predetermined volumes of liquid passing through the pipe line may be discharged from the device per revolution of the rotating element. In utilizing such devices the rotation of the proportioning element is usually timed with another operation which requires the feeding of predetermined volumes of liquid from the proportioning device to accomplish a given purpose, such as, the continuous preparation of a predetermined proportioned mixture.

In the present construction the proportioning device may be interposed in a suitable pipe line, the pipes (not shown) being connected in the openings 6 and 7. A rotor 9, comprising the features of my invention, is positioned within the compartment 2 and comprises a metal core 10 having a cylindrical external surface upon which is mounted a substantially cylindrical sleeve 11 constructed of resilient material such as rubber, rubber composition or other rubber-like material. The sleeve 11 is preferably vulcanized to the surface of the core 10 or united thereto by the use of a suitable adhesive. Projecting radially from the sleeve are a plurality of vanes 12 which are coextensive with the length of the sleeve and are angularly spaced from each other.

The rotor 9 is mounted upon a shaft 13 journalled in bearings 14 and 15 carried by the face plate 3 and cup shaped member 1 respectively. In order to render the rotor immovable upon the shaft with respect to rotational movement, the shaft 13 is provided with a flattened portion 16 and the core 10 is provided with an opening 17 which registers with the flattened shaft.

As an important feature of my invention the end surfaces of the core 10 and sleeve 11 are dished inwardly as shown best at 18 in Fig. 2, that is, the end surfaces of the core and sleeve comprise essentially inwardly extending conical surfaces. When the rotor 9 is positioned within the housing and seating of the face plate 3 tends to compress the outer edges 11' of the opposite ends of the sleeve 11. In other words, the length of the cylindrical sleeve 11 along its outer surface is slightly greater than the distance between the opposite interior walls of the housing. It will be noted that this compression is initiated along the circular line of the edges 11' and the final compression involves only annular areas adjacent the lines 11'. In thus compressing the annular areas of the ends of sleeve 11 adjacent lines 11' a seal is provided at the surface contact of said annular areas and the interior side walls of the housing.

In addition the opposite radial edges 19 of each of the vanes 12 are tapered angularly as are also the longitudinal peripheral edges 20 of each of the vanes. These angular tapers comprise essentially dihedral angles whereby the defining edges of each of the vanes 12 comprise the crest or ridge of the dihedral angle.

When the rotor 9 is positioned within the housing the opposite edges 19 of the vanes 12 are slightly compressed. Likewise, the effective radial lengths of the vanes 12 are such that the peripheral edges 20 of the vanes are also compressed as shown best at 20' in Fig. 1. In this fashion a seal is formed between the various walls of the housing and the edges 19 and 20 of the respective vanes. In a manner described hereinbefore with respect to sleeve 11, the compression of the vanes 12 is initiated along the lines 19 and 20 where the effective thickness of the vanes is reduced. In this manner a seal is provided along the respective areas of contact between the vanes and housing walls. The sealing action afforded by the compression of the vanes effectively prevents leakage of fluid from one sector or compartment defined by the vanes and the wall of the housing to the next adjacent compartment. In this manner a predetermined volume of fluid may be delivered from the inlet 6 to the discharge 7 without any leakage from one compartment to the next adjacent compartment during rotation of the rotor.

In view of the fact that the compression of the resilient material comprising the rotor occurs essentially along a relatively small contact area the friction of the rotor in moving within the compartment 2 is reduced to a minimum. It will be noted that theoretically contact between the rotor and the interior walls of the housing will occur along the lines 19, 20 and the circular lines 11' comprising the peripheral end edges of the sleeve 11. Actually, however, the material comprising the rotor at these respective positions is slightly compressed and a degree of surface contact occurs along these designated lines. However, in view of the fact that the material adjacent the lines 19, 20 and the peripheral lines of the end surfaces of the sleeve 11 is of reduced thickness, the material being tapered to the line of contact, the contacting pressure effecting the seal hereinbefore described will not be sufficiently great to cause excess friction during rotation of the rotor. Yet, the seal will be effective to prevent leakage from the housing and leakage from one rotor compartment to the next rotor compartment.

Of course, if the rotor 9 is to be employed as a fluid pump rotor or a fluid motor rotor the degree of compression of the various areas of contact of the rotor with the housing walls will be increased. However, for relatively low pressure differentials a comparatively slight degree of compression would be effective to accomplish the desired seal without causing excess friction.

I claim as my invention:

1. A rotor constructed of relatively resilient material having a central cylindrical portion and a plurality of radially extending vanes, the surfaces of the opposite ends of said cylindrical portion being conically tapered axially and radially inwardly from substantially the peripheries of said end surfaces and the maximum axial length of said cylindrical portion occurring at its periphery.

2. In a fluid transferring device comprising a housing having an inlet and outlet, and a rotatable shaft journalled in said housing, a rotor constructed of resilient material carried by said shaft in said housing, said rotor comprising a substantially cylindrical sleeve and a plurality of vanes radially extending from said sleeve, an end surface of said sleeve being conically tapered inwardly toward said shaft and inwardly toward the center of mass of said sleeve and the peripheral portions of said vanes comprising tapered edges, the maximum axial length of said sleeve occurring at the periphery of said sleeve, the maximum axial length of said sleeve and the maximum axial length of said vanes being greater than the distance between opposite interior walls of said housing whereby the outer peripheral edge of the conically tapered end of said sleeve and the tapered edges of said vanes contact the opposite interior walls of said housing under pressure to compress and deform the contacting edges of the rotor to provide fluid seals between said contacting edges of said rotor and said housing walls.

3. A rotor constructed of relatively resilient material having a central cylindrical sleeve, a plurality of vanes carried by said sleeve and extending radially outwardly with respect to said sleeve, the maximum axial length of said vanes being substantially coextensive with the maximum axial length of said sleeve, the surfaces of the ends of said sleeve being substantially conically tapered axially and radially inwardly from substantially the outer peripheries of said end surfaces toward the center of said sleeve, the maximum axial length of said sleeve occurring at its periphery, and the peripheral portions of said vanes being tapered to edges of relatively restricted area.

4. A rotor constructed of relatively resilient material comprising a central cylindrical sleeve having a longitudinal and transverse axis, a plurality of radial vanes extending from the outer cylindrical surface of said sleeve, an end surface of said sleeve being substantially conically tapered inwardly from the outer periphery of said end surface with the apex of the conical taper occurring on said longitudinal axis and inwardly from said end surface toward said transverse axis.

5. In a fluid transferring device comprising a housing having an inlet and outlet and a rotatable shaft journaled in said housing, a rotor constructed of resilient material carried upon said shaft in said housing, radially extending vanes carried by said rotor for transferring fluid from said inlet to said outlet when the rotor is rotated, said rotor comprising a cylindrical sleeve having a longitudinal axis and a transverse axis, an end surface of said rotor being substantially conically tapered inwardly toward said longitudinal axis with the apex of said conical surface occurring on said longitudinal axis and being disposed inwardly toward the transverse axis of said sleeve to provide a tapered peripheral circular edge at the tapered end of said sleeve, the maximum axial length of said sleeve being greater than the distance between opposite interior walls of said housing and occurring at the periphery of said sleeve whereby said tapered edge contacts one of said interior walls of said housing under pressure to compress and deform said edge to provide a fluid seal between said contacting edge and said contacted interior wall.

IRVIN H. LEHMAN.

References Cited in the file of this patent

UNITED STATES PATENTS

| Number | Name | Date |
| --- | --- | --- |
| 2,052,474 | Johnson | Aug. 25, 1936 |
| 2,189,356 | Briggs | Feb. 6, 1940 |
| 2,258,371 | Wernert | Oct. 7, 1941 |
| 2,455,194 | Rumsey | Nov. 30, 1948 |
| 2,460,952 | Simer | Feb. 8, 1949 |
| 2,466,440 | Kiekhaefer | Apr. 5, 1949 |
| 2,499,163 | Rand | Feb. 28, 1950 |